US012781891B2

(12) United States Patent
Krüger et al.

(10) Patent No.: US 12,781,891 B2
(45) Date of Patent: Nov. 3, 2026

(54) PROFILED CLAMP

(71) Applicant: NORMA GERMANY GMBH, Maintal (DE)

(72) Inventors: Manfred Krüger, Maintal (DE); Natan Lantsmann, Maintal (DE); Achim Kamp, Maintal (DE); Detlef Henrich, Maintal (DE)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 18/847,360

(22) PCT Filed: Mar. 13, 2023

(86) PCT No.: PCT/EP2023/056300
§ 371 (c)(1),
(2) Date: Sep. 16, 2024

(87) PCT Pub. No.: WO2023/174847
PCT Pub. Date: Sep. 21, 2023

(65) Prior Publication Data

US 2025/0198552 A1 Jun. 19, 2025

(30) Foreign Application Priority Data

Mar. 15, 2022 (DE) ..................... 10 2022 105 973.1

(51) Int. Cl.
*F16L 23/08* (2006.01)
*F16L 23/00* (2006.01)

(52) U.S. Cl.
CPC ............. *F16L 23/08* (2013.01); *F16L 23/003* (2013.01)

(58) Field of Classification Search
CPC ................................ F16L 23/08; F16L 23/003
(Continued)

(56) References Cited

U.S. PATENT DOCUMENTS 5,586,739 A 12/1996 Gantner et al.
5,915,739 A * 6/1999 Cradduck ............... F16L 33/03 285/23

(Continued)

FOREIGN PATENT DOCUMENTS

DE 4411220 A1 10/1995
DE 102020116406 A1 12/2021
WO WO2019042550 A1 3/2019

OTHER PUBLICATIONS

International Search Report for International Application No. PCT/EP2023/056300 dated May 24, 2023 (3 pages).

(Continued)

*Primary Examiner* — David Bochna
(74) *Attorney, Agent, or Firm* — REISING ETHINGTON, P.C.

(57) ABSTRACT

A profiled clamp has a clamp band, which extends in a peripheral direction about a longitudinal axis between a first clamping head and a second clamping head, the clamp band having a clip element. The clip element has a fastening portion, which fastens the clip element to the clamp band such that the clip element is stationary at least in the peripheral direction, and a protrusion portion, which extends away from the clamp band up to a free end piece. Thus, a profiled clamp for which rotation is avoided simply and economically in the premounted stated is provided.

10 Claims, 3 Drawing Sheets

(58) Field of Classification Search
USPC .......................................................... 285/23
See application file for complete search history.

(56) References Cited

U.S. PATENT DOCUMENTS

| | | | | |
|---|---|---|---|---|
| 6,343,772 | B1 * | 2/2002 | Oi ........................... | F16L 33/03<br>248/65 |
| 11,156,315 | B2 * | 10/2021 | Paes ...................... | F16L 23/003 |
| 11,454,156 | B2 * | 9/2022 | Koehler ................ | F16L 23/003 |
| 11,846,373 | B2 * | 12/2023 | Cottle ................... | F16L 23/003 |
| 2005/0099001 | A1 * | 5/2005 | Cassel ................. | F01N 13/1805<br>285/23 |
| 2017/0284578 | A1 | 10/2017 | Prevot et al. | |
| 2020/0240557 | A1 * | 7/2020 | Guevel ................... | F16L 23/08 |
| 2020/0292113 | A1 * | 9/2020 | Kayacik .................. | F16L 23/08 |
| 2021/0148498 | A1 * | 5/2021 | Jacquelin .............. | F16L 23/003 |

OTHER PUBLICATIONS

English Translation of International Search Report for International Application No. PCT/EP2023/056300 dated May 24, 2023 (2 pages).

* cited by examiner

A-A

PROFILED CLAMP

INTRODUCTION

The disclosure relates to a profiled clamp having a clamp band which extends in a circumferential direction about a longitudinal axis between a first tensioning head and a second tensioning head, wherein the clamp band has a clip element.

Profiled clamps are used, for example, to connect fluid lines, with the fluid lines having flanges on their end portions. The profiled clamp is arranged over the flanges of two fluid lines to be connected and is then closed. Here, the clamp band has a profile for receiving the flanges. In order to close the profiled clamps, use is made of the tensioning heads, which, for example, are moved towards one another by way of a screw such that the clamp band is clamped around the flanges.

To facilitate the mounting of profiled clamps, it is possible for profiled clamps to be premounted on the flanges. In the premounted state, the profiled clamps are not yet completely closed, with the result that the profiled clamp is arranged so as to be rotatable about the flanges. This can make the final mounting more difficult, since the profiled clamp first has to be oriented prior to the final mounting.

SUMMARY

An object of the disclosure, per an embodiment, is therefore to provide a profiled clamp in which a rotation in the premounted state is avoided with little effort and cost-effectively.

In a profiled clamp having a clamp band which extends in a circumferential direction about a longitudinal axis between a first tensioning head and a second tensioning head, wherein the clamp band has a clip element, provision is made according to the disclosure, per an embodiment, for the clip element to have a fastening portion, which releasably fastens the clip element to the clamp band in a positionally fixed manner at least in the circumferential direction, and a leg portion, which extends away from the clamp band up to the free end piece.

There is thus provided a profiled clamp having a clip element which, per an embodiment, at least for the premounting, can be releasably fitted to the profiled clamp by way of the fastening portion. The fastening portion is designed here for releasably fastening the clip element to the profiled clamp. The fastening portion can produce here a releasable latching connection between the clip element and the clamp band of the profiled clamp, wherein, after the fastening to the clamp band, the clip element can no longer be moved in the circumferential direction along the clamp band. It is conceivable that the fastening portion engages around the clamp band, for example from outside. The clip element is fastened to the clamp band in a positionally fixed manner in the circumferential direction by way of the fastening portion. After fastening the clip element to the clamp band, the leg portion projects from the clamp band, preferably in a direction parallel to the longitudinal axis. Since the leg portion extends away from the clamp band, it is possible during the premounting for the leg portion to be manually fixed, for example by a user, until the final mounting or to be placed in the circumferential direction onto a counterpart element which is fastened to one of the fluid lines to be connected. By virtue of the clip element being fastened in a positionally fixed manner at least in the circumferential direction, a rotation of the profiled clamp about the longitudinal axis in the circumferential direction is thus avoided. This facilitates the premounting and the final mounting of the profiled clamp. Furthermore, the clip element is able to be produced cost-effectively and with little effort and can be fastened to the profiled clamp in a simple manner.

According to a further example, the leg portion and the fastening portion can be arranged so as to be offset from one another about the longitudinal axis in the circumferential direction.

The connection between the leg portion and the fastening portion can thus be configured to be stable. Furthermore, a complex contour of the clip element is avoided. Furthermore, the fastening of the clip element can then be arranged in the circumferential direction so as to be offset from the bearing position of the leg portion on a counterpart element of one of the fluid lines to be fastened. Consequently, the fastening portion is not concealed by the leg portion and can be visually monitored in order, for example, to detect damage or a correct fastening.

It is also possible, for example, for a connecting portion of the clip element to connect the leg portion to the fastening portion.

According to this example, the connecting portion can extend in the circumferential direction.

The connecting portion makes it possible in a simple manner for the leg portion to be arranged so as to be offset with respect to the fastening portion in the circumferential direction.

According to another example, the clamp band can have two half-shells, wherein the clip element is arranged on one of the two half-shells.

The half-shells of the clamp band can be connected to one another via a bridge which, in the mounted state of the profiled clamp, can be arranged diametrically opposite the tensioning heads. Alternatively, the half-shells can be connected to one another via a releasable articulated coupling. The half-shells have a profile which is designed for receiving two flanges placed on one another.

According to one example, the clamp band can have at least one receptacle for the fastening portion, wherein the fastening portion is arranged in the receptacle.

The receptacle can be, for example, a recess which is arranged on an edge portion of the clamp band. The recess can be delimited by edges which extend substantially in the radial direction with respect to the longitudinal axis. When the fastening portion engages in the recess in order to fasten the clip element to the clamp band, the edges produce a form-fit in the circumferential direction. Consequently, the recess has the effect of achieving improved positionally fixed fastening of the clip element in the circumferential direction.

According to one example, the leg portion can be arranged so as to be offset from one of the tensioning heads about the longitudinal axis in the circumferential direction by 70° to 110°, preferably 80° to 100°, further preferably 90°.

There is thus a distance between the tensioning heads and the leg portion, with the result that impairment of the handling of the tensioning heads by the leg portion, and vice versa, is avoided.

According to one example, the fastening portion can extend between a first holding element and a second holding element arranged opposite the first holding element, wherein the holding elements fasten the clip element to the clamp band.

The fastening portion can be in the form of a band between the holding elements, wherein the holding elements can form end regions of the fastening portion which are situated opposite one another along the fastening portion.

BRIEF DESCRIPTION OF THE FIGURES

Further features, details and advantages of the disclosure emerge from the wording of the claims and from the following description of exemplary embodiments with reference to the drawings, in which:

DETAILED DESCRIPTION

In the following, the profiled clamp is referenced in its entirety by the reference sign 10.

Figure 1A:
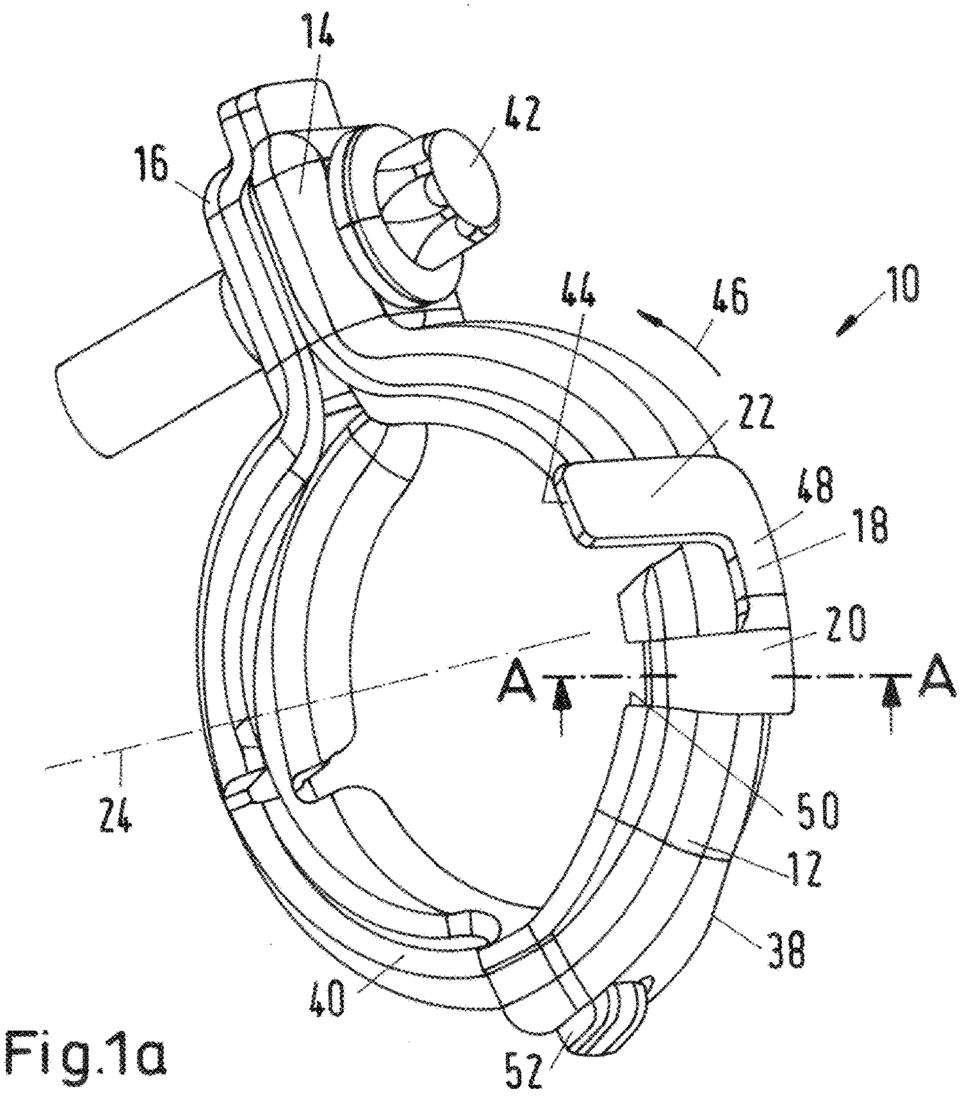
FIGS. 1*a, b* show a schematic illustration of a profiled clamp.

As illustrated in FIG. 1*a*, the profiled clamp 10 has a clamp band 12 which extends about a longitudinal axis 24 along a circumferential direction 46. In this example, the clamp band 12 has two half-shells 38, 40. The half-shells 38, 40 are connected to one another at one end. This connection may be releasable, with one of the half-shells 38, 40 being able to be hooked into an opening in the other half-shell 38, 40 by way of a hook 52.

Alternatively, the two half-shells 38, 40 can be connected to one another via a joint or a bridge (not shown).

The first half-shell 38 has a first tensioning head 14 at an end opposite the connection between the half-shells 38, 40. Likewise, the second half-shell 40 has a second tensioning head 16 at an end opposite the connection between the half-shells 38, 40. The tensioning heads 14, 16 make it possible for the profiled clamp 10 to be tensioned by way of a tensioning element 42, in this example a screw.

On the clamp band 12 there can be arranged a receptacle 50 which can take the form of a recess in one of the half-shells 38, 40. A clip element 18 is fastened in the receptacle 50. For this purpose, the clip element 18 has a fastening portion 20 by which the clip element 18 can be releasably latched in the receptacle 50 or clamp band 12.

Figure 1B:
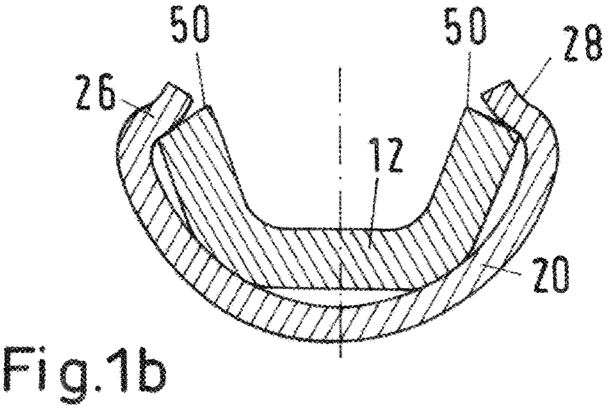

As illustrated in FIG. 1*b*, which shows a sectional view along the line A-A from FIG. 1*a*, the fastening portion 20 engages around the clamp band 12 from outside. The fastening portion 20 extends here from a first holding element 26 to a second holding element 28, which engage in a respective receptacle 50 on the clamp band 12. When the clip element 18 is fastened to the profiled clamp 10, the fastening portion 20 is oriented substantially parallel to the longitudinal axis 24.

The fastening portion 20 fastens the clip element 18 to the clamp band 12 such that said clip element is immovable in the circumferential direction 46. The immovable fastening can also be referred to as positionally fixed fastening on the clamp band 12.

In the illustrated example, the engagement of the holding elements 26, 28 of the fastening portion 20 in the receptacle 50 has the effect that the edges of the receptacle 50 which are oriented in the radial direction form a form-fit with the holding elements 26, 28 in the circumferential direction 46. The width of the holding elements 26, 28 in the circumferential direction 46 corresponds here to the width of the receptacle 50 in the circumferential direction 46, with the result that, in the circumferential direction 46, the edges of the receptacle 50 bear against the holding elements 26, 28 or the fastening portion 20.

Figure 2:
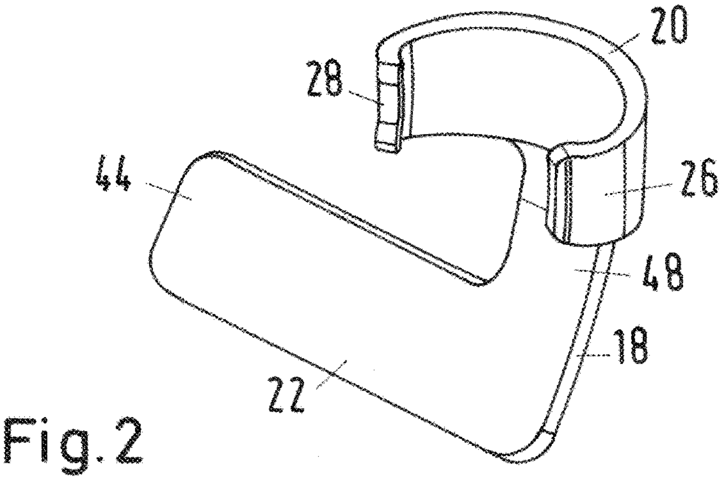
FIG. 2 shows a schematic illustration of a clip element.

In FIG. 2, the clip element 18 is illustrated before it is fastened to a profiled clamp 10. A connecting portion 48 extends away from the fastening portion 20. The connecting portion 48 can extend in the circumferential direction 46 when the clip element 18 is fastened to the profiled clamp 10.

At an end of the connecting portion 48 situated opposite to the fastening portion 20, the clip element 18 has a leg portion 22. The leg portion 22 extends from the connecting portion 48 up to a free end piece 44. Once the clip element 18 is fastened to the profiled clamp 10, the leg portion 22 can extend parallel to the longitudinal axis 24.

Via the connecting portion 48, the fastening portion 20 and the leg portion 22 are arranged so as to be offset from one another in the circumferential direction 46 when the clip element 18 is fastened to the profiled clamp 10. That is to say that the fastening portion 20 and the leg portion 22 are arranged at different angular positions on the profiled clamp 10 in the circumferential direction 46. This avoids a situation in which the leg portion 22 extends directly away from the fastening portion 20, and therefore a stable connection of the leg portion 22 to the clip element 18 can be provided.

When the clip element 18 is fastened to the profiled clamp 10, the leg portion 22 can be arranged at another angular position than the tensioning heads 14, 16 in the circumferential direction 46. The leg portion 22 can be arranged so as to be offset from one of the tensioning heads 14, 16 about the longitudinal axis 24 in the circumferential direction 46 by 70° to 110°, preferably 80° to 100°, further preferably 90°.

This avoids a situation in which the leg portion 22 impedes the handling of the tensioning heads 14, 16 when tensioning the profiled clamp 10.

The clip element 18 can be in one piece and consist of a plastics material or a metal.

The fastening portion 20 allows the clip element 18 to be fastened to the clamp band 12 with little effort.

Figure 3A:
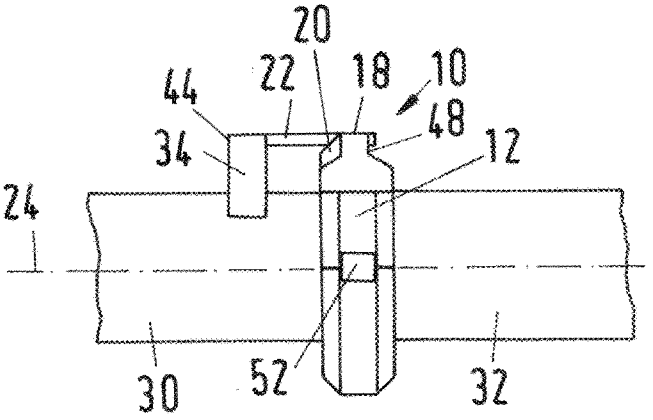
FIGS. 3*a, b* show a schematic illustration of a pipe connection by way of a profiled clamp.
Figure 3B:
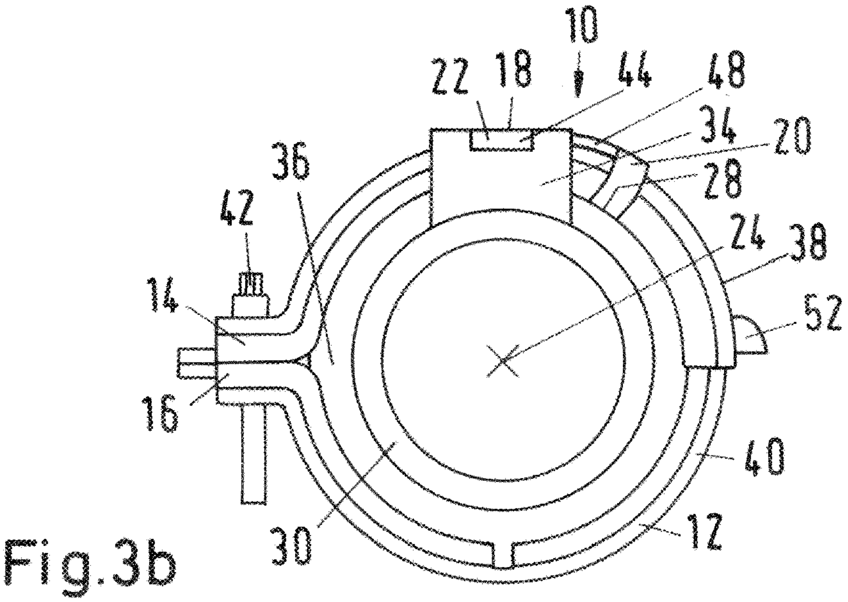

FIGS. 3*a* and 3*b* illustrate different views of a profiled clamp 10 in a mounted state.

The profiled clamp 10 connects a first fluid line 30 to a second fluid line 32. For this purpose, the profiled clamp 10 is arranged on two flanges 36, with each of the interconnected ends of the fluid lines 30, 32 having a flange 36.

At least one of the fluid lines 30, 32 has a counterpart element 34 for the leg portion 22. The counterpart element 34 is fixedly connected to the corresponding fluid line 30, 32 and can receive the leg portion 22 and fix it in the circumferential direction 46.

The leg portion 22 can already have been received in the counterpart element 34 in a premounted state of the profiled clamp 10. In the premounted state, the profiled clamp 10 has already been arranged around the flanges of the fluid lines 30, 32, although the tensioning heads 14, 16 have not yet been braced.

The counterpart element 34 can be arranged so as to be spaced apart from the flange of the corresponding fluid line 30, 32. Here, the leg element 22 has a length between the connecting portion 48 and the free end piece 44 that matches the distance between the counterpart element 34 and the flange.

Figure 4A:
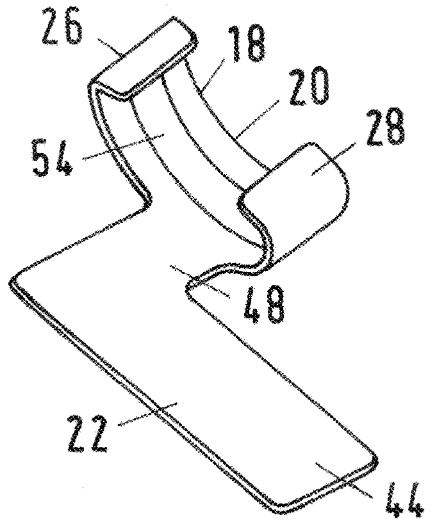
FIGS. 4*a, b* show a schematic illustration of a further embodiment of the clip element.
Figure 4B:
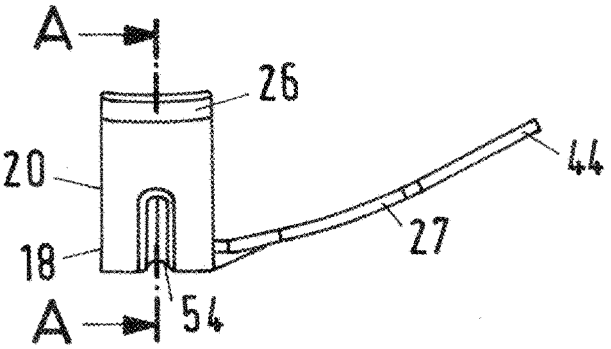

FIGS. 4*a* and 4*b* illustrate a further embodiment of the clip element 18. FIG. 4*a* shows here a schematic perspective illustration of the clip element 18. FIG. 4*b* shows an illustration of the clip element 18 from the side.

In addition to the elements of the embodiment of the preceding FIGS. 1 to 3, the clip element 18 of this embodiment has a bead 54. The bead 54 extends along the fastening portion 20 between the holding elements 26, 28. Furthermore, the bead 54 extends in the direction of the region in which the clamp band 12 can be fastened.

Figure 5:
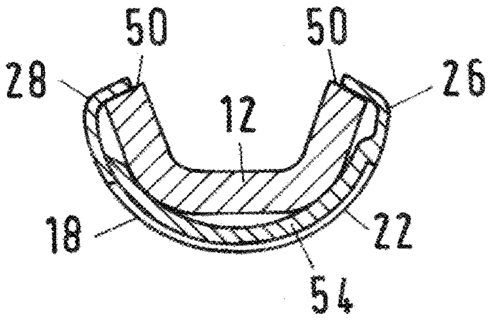
FIG. 5 shows a schematic sectional illustration of the clip element from FIG. 4 arranged on a profiled clamp.

This is illustrated in more detail in the sectional illustration from FIG. 5. The bead 54 is arranged here between the clamp band 12 and the fastening portion 20.

By virtue of the bead 54, the clip element 18 bears only tangentially on the outer contour of the clamp band 12. This makes it possible to increase the pretensioning of the clip element 18, with the result that the fastening of the clip element 18 for the premounting on the clamp band 12 becomes more secure.

The disclosure is not limited to one of the above-described embodiments, but can be modified in various ways.

Instead of a counterpart element 34, the leg portion 22 can also be held in position by a user (not shown). In this case, the user has to hold the leg portion 22 in position until the profiled clamp 10 is braced firmly enough by way of the tensioning heads 14, 16 that it is no longer able to rotate about the longitudinal axis 24.

Furthermore, it is also possible for the counterpart element 34 to be fastened to a component other than the fluid line 30, 32 if this component is positionally fixed with respect to the fluid line 30, 32.

All of the features and advantages that are disclosed by the claims, the description and the drawing, including structural design details, spatial arrangements and method steps, may be essential to the invention both on their own and in the widest variety of combinations.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Profiled clamp
12 Clamp band
14 Tensioning head
16 Tensioning head
18 Clip element
20 Fastening portion
22 Leg portion
24 Longitudinal axis
26 First holding element
28 Second holding element
30 Fluid line
32 Fluid line
34 Counterpart element
36 Flange
38 Half-shell
40 Half-shell
42 Tensioning element
44 Free end piece
46 Circumferential direction
48 Connecting portion
50 Receptacle
52 Hook
54 Bead

The invention claimed is:

1. A profiled clamp having a clamp band which extends in a circumferential direction about a longitudinal axis between a first tensioning head and a second tensioning head, wherein the clamp band has a clip element, wherein the clip element has a fastening portion, which releasably fastens the clip element to the clamp band in a positionally fixed manner at least in the circumferential direction, and a leg portion, which extends away from the clamp band up to a free end piece in such a way, that once the clip element is fastened to the profiled clamp, the leg portion extends parallel to the longitudinal axis, wherein the leg portion and the fastening portion are arranged so as to be offset from one another about the longitudinal axis in the circumferential direction, wherein the clamp band has two half-shells, wherein the clip element is arranged on one of the two half-shells.

2. The profiled clamp as claimed in claim 1, wherein a connecting portion of the clip element connects the leg portion to the fastening portion.

3. The profiled clamp as claimed in claim 2, wherein the connecting portion extends in the circumferential direction.

4. The profiled clamp as claimed in claim 1, wherein the clamp band has at least one receptacle for the fastening portion, wherein the fastening portion is arranged in the receptacle.

5. The profiled clamp as claimed in claim 4, wherein the receptacle is a recess arranged on an edge portion of the clamp band.

6. The profiled clamp as claimed in claim 5, wherein the recess is delimited by edges which extend in the radial direction with respect to the longitudinal axis, wherein the fastening portion engages in the recess in order to fasten the clip element to the clamp band, the edges produce a form-fit in the circumferential direction.

7. The profiled clamp as claimed in claim 1, wherein the leg portion is arranged so as to be offset from one of the tensioning heads about the longitudinal axis in the circumferential direction by 70° to 110°.

8. The profiled clamp as claimed in claim 1, wherein the fastening portion extends between a first holding element and a second holding element arranged opposite the first holding element, wherein the first and second holding elements fasten the clip element to the clamp band.

9. The profiled clamp as claimed in claim 1, wherein the leg portion is arranged so as to be offset from one of the tensioning heads about the longitudinal axis in the circumferential direction by 80° to 100°.

10. The profiled clamp as claimed in claim 1, wherein the leg portion is arranged so as to be offset from one of the tensioning heads about the longitudinal axis in the circumferential direction by 90°.

* * * * *